United States Patent
Ho et al.

(10) Patent No.: US 9,014,875 B2
(45) Date of Patent: Apr. 21, 2015

(54) VEHICLE REMOTE CONTROL KEY AND VEHICLE REMOTE CONTROL SYSTEM USING THE SAME

(71) Applicant: Hon Hai Precision Industry Co., Ltd., New Taipei (TW)

(72) Inventors: Meng-Yu Ho, New Taipei (TW); Ming-Hung Chung, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/847,054

(22) Filed: Mar. 19, 2013

(65) Prior Publication Data

US 2013/0261845 A1 Oct. 3, 2013

(51) Int. Cl.
*G05D 1/00* (2006.01)
*G06F 17/00* (2006.01)
*G07C 9/00* (2006.01)

(52) U.S. Cl.
CPC ............ *G06F 17/00* (2013.01); *G07C 9/00944* (2013.01); *G07C 2009/00507* (2013.01)

(58) Field of Classification Search
CPC .......... G06F 17/00; G07C 5/008; B60R 25/24

USPC .............................................. 701/2
See application file for complete search history.

(56) References Cited

U.S. PATENT DOCUMENTS

2009/0113961 A1* 5/2009 Muller ............................ 70/256

* cited by examiner

*Primary Examiner* — Thomas G Black
*Assistant Examiner* — Luke Huynh
(74) *Attorney, Agent, or Firm* — Novak Druce Connnolly Bove + Quigg LLP

(57) ABSTRACT

A vehicle remote control key for controlling a vehicle, includes a main body, a handle portion, a control module, a displaying module, a terminal communication module and a touch module. The main body includes a first display panel and at least one touch screen. The handle portion is connected to the main body. The terminal communication module is electrically connected to the control module. The display module is electrically connected to the first display panel and the control module, the terminal communication module sends vehicle information to the control module, and the vehicle information is displayed on the first display panel via the display module, the touch module is electrically connected to the at least one touch screen and the control module, when the vehicle is in a parked state, it can be controlled via touching of the touch screen.

10 Claims, 2 Drawing Sheets

VEHICLE REMOTE CONTROL KEY AND VEHICLE REMOTE CONTROL SYSTEM USING THE SAME

BACKGROUND

1. Technical Field

The present disclosure relates to vehicle control system, and more particularly, to a vehicle remote control key and vehicle remote control system using the same.

2. Description of Related Art

A vehicle remote control key (key fob) is employed to control a vehicle, such as locking/releasing door or trunk of the vehicle when the vehicle is in parked state. The vehicle remote control key includes a main body and a plurality of buttons on the main body. When the door or trunk is closed, the corresponding button of the vehicle remote control key is pressed for locking/unlocking the door or the trunk. However, sometimes, it is difficult to assure that the door or the trunk is securely locked. Therefore, it is still needed to press the button of the vehicle remote control key again to ensure the door or the trunk is locked.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
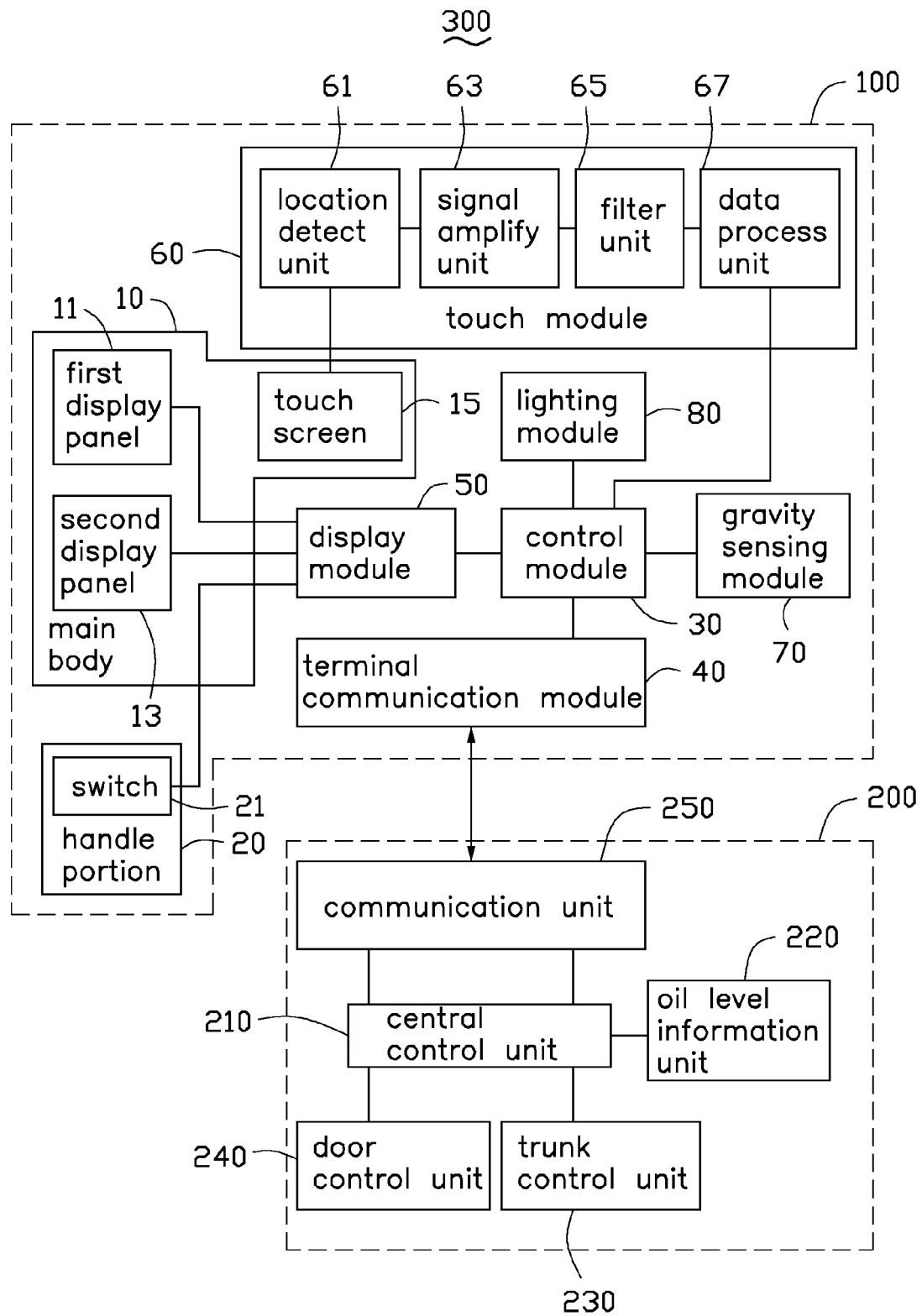
FIG. 1 is a function block diagram view of an embodiment of a vehicle remote control system.

FIG. 1 is an embodiment of a vehicle remote control system 300. The vehicle remote control system 300 includes a vehicle remote control key 100 and a control assembly 200 mounted in a vehicle (not shown). The vehicle remote control key 100 is capable of establishing a short-range wireless connection with the control assembly 200, for controlling the vehicle, and the information of the vehicle can be displayed on the vehicle remote control key 100. The control assembly 200 includes a central control unit 210, an oil level information unit 220, a trunk control unit 230, a door control unit 240 and a communication unit 250. The oil level information unit 220, the trunk control unit 230, the door control unit 240 and the communication unit 250 are electrically connected to the central control unit 210, respectively. The oil level information unit 220, the trunk control unit 230, and the door control unit 240 are configured to sense an oil level information, a locking/releasing information of the trunk, and a locking/releasing information of the door, respectively, and sends the above-mentioned sensed oil level and locking/releasing information to the central control unit 210. The central control unit 210 transfers the above-mentioned sensed information to the vehicle remote control key 100 via the communication unit 250. Furthermore, the central control unit 210 is capable of receiving touch commands from the vehicle remote control key 100 via the communication unit 250, and controls the door and the trunk respectively via the door control unit 240 and the trunk control unit 230.

Figure 2:
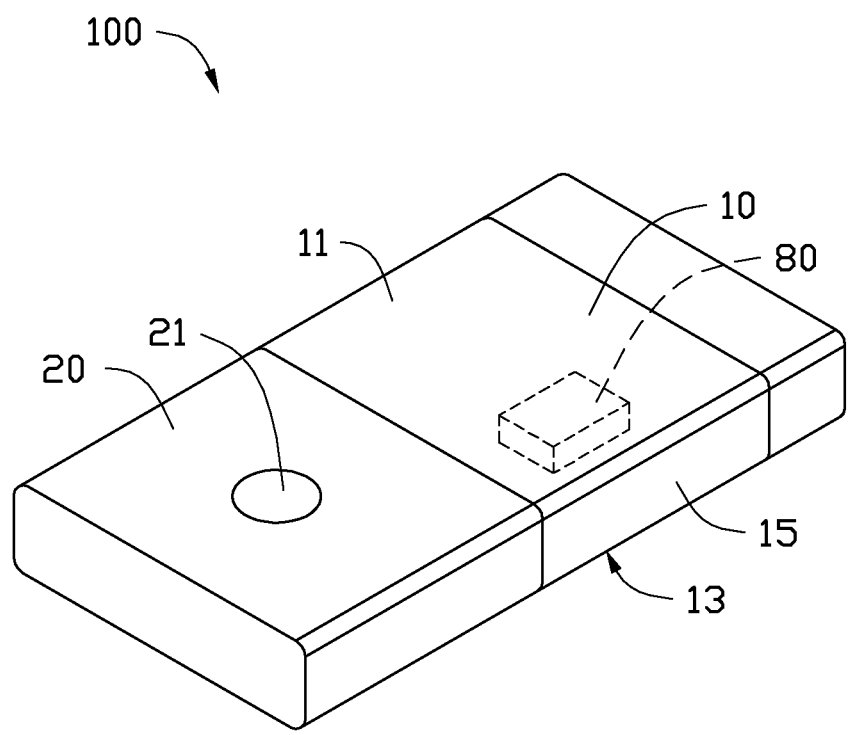
FIG. 2 is an isometric view of a vehicle remote control key of the vehicle remote control system of FIG. 1.

FIG. 2 shows that the vehicle remote control key 100 is substantially a rectangular block. As shown together in FIGS. 1 and 2, the vehicle remote control key 100 includes a main body 10, a handle portion 20 connected to an end of the main body 10, a control module 30, a terminal communication module 40, a display module 50, a touch module 60, a gravity sensing module 70 and a lighting module 80. The control module 30, the terminal communication module 40, the display module 50, the touch module 60, the gravity sensing module 70 and the lighting module 80 are mounted on the main body 10. The terminal communication module 40, the display module 50, the touch module 60, the gravity sensing module 70 and the lighting module 80 are electrically connected to the control module 30, respectively.

The main body 10 includes a first display panel 11, a second display panel 13 and a pair of touch screens 15. The first display panel 11 and the second display panel 13 are located at a top surface and a bottom surface of the main body 10, respectively, and are electrically connected to the display module 50, (see FIG. 1) respectively. The pair of touch screens 15 is formed at opposite sides of the main body 10. In the illustrated embodiment, opposite ends of the touch screen 15 are connected to the first display panel 11 and the second display panel 13 smoothly by having arc-shaped (rounded) edges. Each touch screen 15 may be connected to the first display panel 11 and the second display panel 13 by having other edge shapes. The pair of touch screens 15 is electrically connected to the touch module 60. In the illustrated embodiment, the touch screens 15 are capacitive touch screens, that is, the touch screen 15 is a four-layer composite glass screen (not shown), and four electrodes (not shown) are applied at four corners thereof.

The handle portion 20 includes a switch 21 electrically connected to the display module 50. The switch 21 is capable of turning on/off the display module 50.

FIG. 1 also shows that the touch module 60 includes a location detect unit 61, a signal amplify unit 63, a filter unit 65 and a data process unit 67 electrically connected to each other in that order. The location detect unit 61 is electrically connected to the pair of touch screens 15, the data process unit 67 is electrically connected to the control module 30.

A small voltage is applied to the touch screen 15 when a touch point is made by a user, and a capacitor is dynamically formed. The location detect unit 61 is capable of determining the location of the touch point indirectly from the change in the capacitance, as measured from the four electrodes of the touch screen 15. The location detect unit 61 sends the location signal of the touch point to the signal amplify unit 63. The signal amplify unit 63 amplifies the location signal of the touch point and sends it to the data processing unit 67 via the filter unit 65. The data processing unit 67 reads the location signal and generates a touch command signal based upon a preset command table. The data processing unit 67 sends the touch command signal to the control module 30. The terminal communication module 40 receives the touch command signal from the control module 30 and transfers it to the central control unit 210 via the communication unit 250. Then the central control unit 210 locks or releases the trunk of the vehicle via the trunk control unit 230, and locks or releases the door of the vehicle via the door control unit 240.

The gravity sensing module 70 is employed and configured to sense whether a top surface or a bottom surface of the main body 10 is facing upward, then determines whether the first display panel 11 or the second display panel 13 displays the information received from the display module 50. The gravity sensing module 70 is electrically connected to the control module 30. Based on the piezoelectric effect, the gravity sensing module 70 senses strengths of weight or forces of the main body 10 along orthogonal directions, then assesses whether the first display panel 11 or the second display panel 13 is facing up. Then, the gravity sensing module 70 sends a message to the control module 30, and the control module 30 controls the display module 50 to light up the first display panel 11 or the second display panel 13 to display information of the vehicle, such as oil level information, the locked/unlocked state of the door or the trunk.

The lighting module 80 is mounted on the main body 10 and is located adjacent to the touch screen 15. The lighting module 80 is electrically connected to the control module 30. When the display module 50 is turned off, the control module 30 controls the lighting module 80 to light and illuminate the touch screen 15.

When in use, the vehicle remote control key 100 is brought close to the vehicle; the terminal communication module 40 establishes a short-range wireless connection with the communication unit 250 of the control assembly 200 mounted in the vehicle. The button 21 is manually pushed to turn on the display module 50; information about the vehicle is displayed on the first display panel 11. The touch screen 15 is touched to lock or release the door and the trunk of the vehicle. When the vehicle remote control key 100 is turned over, the second display panel 13 displays above-mentioned information. When the button 21 is pushed to power off the display module 50, the lighting module 80 turns on to illuminate the vehicle remote control key 100.

The vehicle remote control key 100 is capable of displaying information of the vehicle on the first display panel 11 and the second display panel 13, benefiting from this information, the driver can conveniently control various functions of the vehicle by touching the touch screens 15. When the display module 50 is turned off, the lighting module 80 is capable of illuminating the vehicle remote control key 100. The lighting module 80 may remain on all the time to illuminate the vehicle remote control key 100.

The pair of touch screens 15 may be substituted by one touch screen and one display screen. When only the first display panel 11 is employed to display information, the second display panel 13 and the gravity sensing module 70 may be omitted.

The button 21 may be electrically connected to the control module 30 directly. The power supplies for the button 21 and the display module 50 are separately divided. Pressing the button 21 for a long time (extended period of time) opens the door via the door control unit 240. The button 21 can also open the car door in an urgent situation, such as when the battery for the display module 50 is fully drained.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A vehicle remote control key for controlling a vehicle, comprising:
    a main body comprising a first display panel and at least one touch screen;
    a handle portion connected to an end of the main body;
    a control module;
    a display module;
    a terminal communication module electrically connected to the control module; and
    a touch module, wherein the control module, the display module and the touch module are received in the main body, the display module is electrically connected to the first display panel and the control module, the terminal communication module is capable of sending vehicle information to the control module, and the vehicle information is displayed on the first display panel via the display module, the touch module comprises a location detect unit, a signal amplify unit, a filter unit and a data process unit electrically connected to each other in that order, the location detect unit is electrically connected to the at least one touch screen, the data process unit is electrically connected to the control module for controlling the vehicle in a parking state by touching the at least one touch screen.

2. The vehicle remote control key of claim 1, wherein the main body further comprises a second display panel electrically connected to the display module, the first display panel and the second display panel are located at a top surface and a bottom surface of the main body, and are electrically connected to the display module, respectively.

3. The vehicle remote control key of claim 2, wherein the at least one touch screen comprises a pair of touch screens formed at opposite sides of the main body, the opposite ends of each touch screen are connected to the first display panel and the second display panel smoothly to form arc-shaped edges.

4. The vehicle remote control key of claim 3, wherein further comprising a gravity sensing module connected to the control module, the gravity sensing module is capable of sensing whether a top surface or a bottom surface of the main body is facing upward, and then determining whether the first display panel or the second display panel is to display information received from the display module.

5. The vehicle remote control key of claim 1, wherein the handle portion comprises a switch electrically connected to the display module, the switch is capable of turning on/off the display module, the vehicle remote control key further comprises a lighting module mounted on the main body, the lighting module is electrically connected to the control unit, when the display module is turned off by the switch, the control unit controls the lighting module to light and illuminate the at least one touch screen.

6. A vehicle remote control system, comprising:
    a control assembly mounted on a vehicle, the control assembly comprising a central control unit, an oil level information unit, a trunk control unit, a door control unit and a communication unit, the oil level information unit, the trunk control unit, the door control unit and the communication unit being electrically connected to the central control unit; and
    a vehicle remote control key, the vehicle remote control key comprising:
        a main body comprising a first display panel and at least one touch screen;
        a handle portion connected to an end of the main body;
        a control module;
        a display module;
        a terminal communication module electrically connected to the control module and capable of establishing a short-range wireless connection with the communication unit of the control assembly; and
        a touch module, wherein the control module, the display module and the touch module are received in the main body, the display module is electrically connected to the first display panel and the control module, the terminal communication module is capable of receiving vehicle information from the communication unit and sending vehicle information to the control module, the vehicle information is displayed on the first display panel via the display module, the touch module comprises a location detect unit, a signal amplify unit, a filter unit and a data process unit electrically connected to each other in that order, the location detect unit is electrically connected to the pair of touch screens, the data process unit is electrically connected to the control module for controlling the vehicle in a parking state by touching the at least one touch screen.

7. The vehicle remote control system of claim 6, wherein the main body further comprises a second display panel connected to the display module, the first display panel and the second display panel are located at a top surface and a bottom surface of the main body, and are electrically connected to the display module.

8. The vehicle remote control system of claim 7, wherein the at least one touch screen comprises a pair of touch screens formed at opposite sides of the main body, opposite ends of each touch screen are connected to the first display panel and the second display panel smoothly in arc-shaped edges.

9. The vehicle remote control system of claim 8, wherein further comprising a gravity sensing module connected to the control module, the gravity sensing module is capable of sensing whether a top surface or a bottom surface of the main body is facing upward, and then determining whether the first display panel or the second display panel is to display information received from the display module.

10. The vehicle remote control system of claim 6, wherein the handle portion comprises a switch electrically connected to the display module, the switch is capable of turning on/off the display module, the vehicle remote control key further comprises a lighting module mounted on the main body, the lighting module is electrically connected to the control unit, when the display module is turned off by the switch, the control unit controls the lighting module to light and illuminate the at least one touch screen.

\* \* \* \* \*